Jan. 16, 1968   A. ABOLINS   3,363,803
CORNER MEMBER FOR VAN SIZE CARGO CONTAINER
Filed Feb. 21, 1967   4 Sheets-Sheet 1

INVENTOR.
ANDREW ABOLINS
BY
Max R. Kiesman
ATTORNEY.

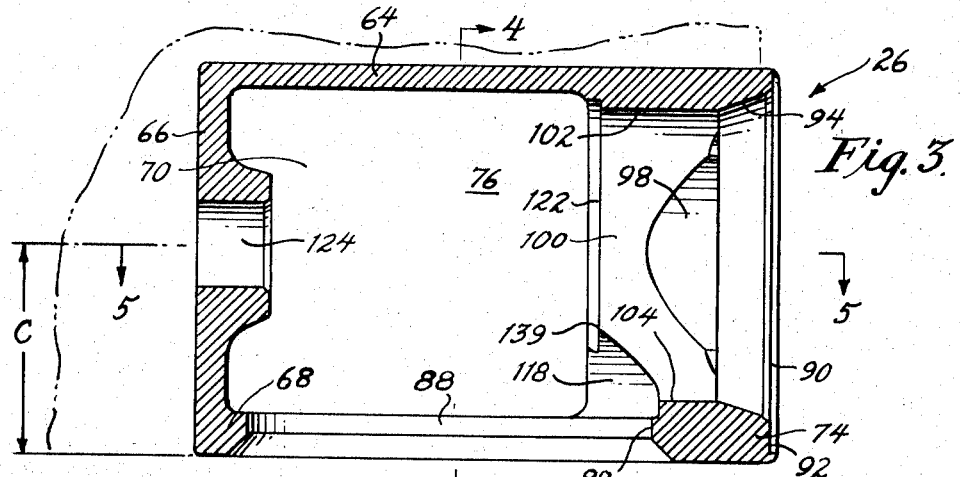
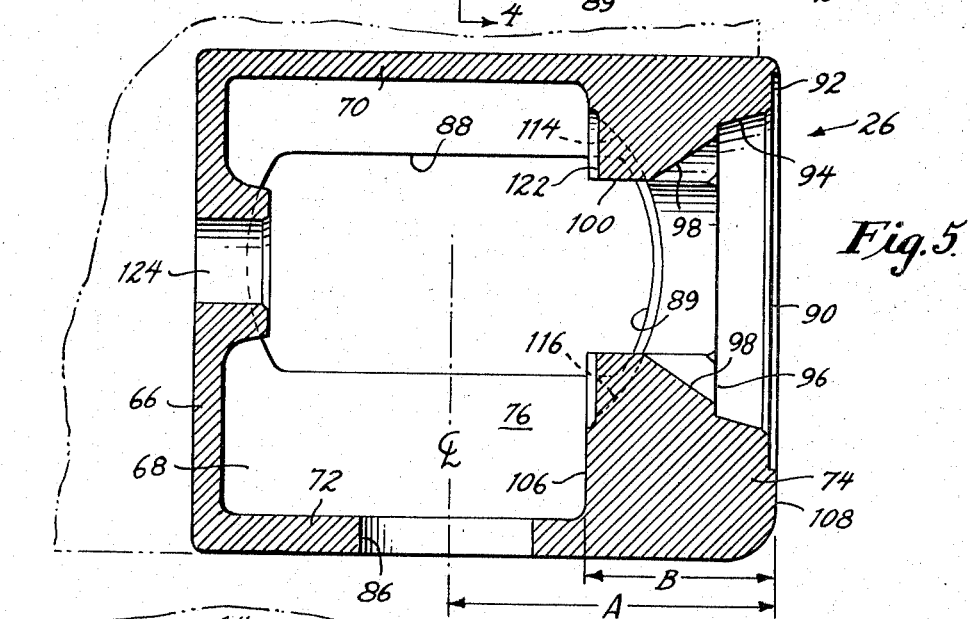
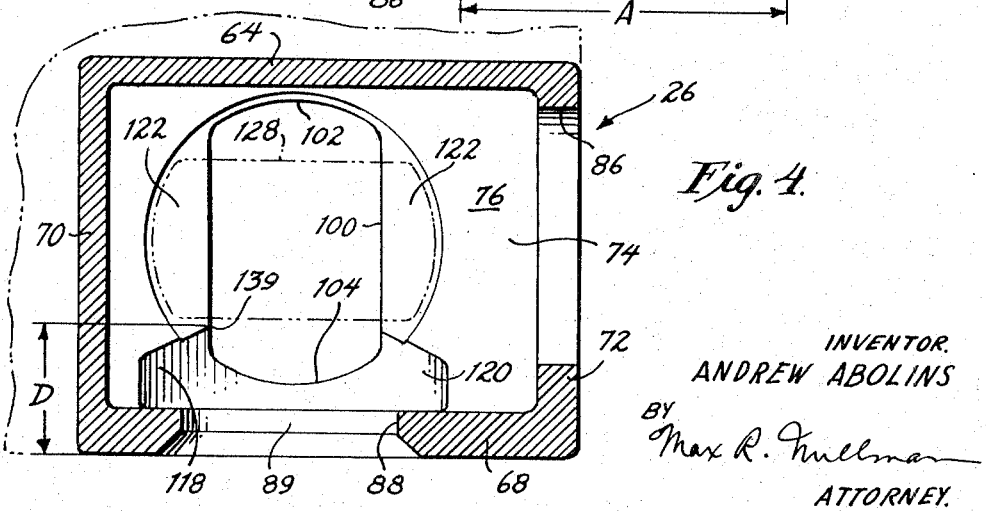

Jan. 16, 1968 A. ABOLINS 3,363,803
CORNER MEMBER FOR VAN SIZE CARGO CONTAINER
Filed Feb. 21, 1967 4 Sheets-Sheet 3

INVENTOR.
ANDREW ABOLINS
BY
Max R. Millman
ATTORNEY.

INVENTOR.
ANDREW ABOLINS
BY
Max R. Trillman
ATTORNEY.

United States Patent Office 3,363,803
Patented Jan. 16, 1968

3,363,803
CORNER MEMBER FOR VAN SIZE CARGO CONTAINER
Andrew Abolins, Langhorne, Pa., assignor to Strick Corporation, Fairless Hills, Pa., a corporation of Pennsylvania
Filed Feb. 21, 1967, Ser. No. 617,686
6 Claims. (Cl. 220—23.4)

ABSTRACT OF THE DISCLOSURE

A van size cargo container of stressed skin construction and members incorporated in the lower corners thereof so that one of said containers can be demountably coupled upon a wheeled adapter frame and a pair of said containers can be coupled end to end for handling as such or for demountable coupling upon a wheeled adapter frame for each container.

---

The modern trend in freight haulage is known in the art as containerization wherein van size cargo containers serve as trailer bodies for over-the-road vehicles and are transferred, laden with cargo, intermodally to a railroad flat car, to a loading dock, aboard ship or into aircraft to be unloaded only at final destination. The efficiency of this operation is increased by providing lightweight containers of stressed skin construction, known in the vehicle art as frameless containers, and removably coupling them end to end by a means capable of converting both laden containers into a single beam so that with separable single axle bogies a unitary dual body, tandem axle semi-trailer can be readily converted to separate single body, single axle semi-trailers as disclosed in Patent No. 3,004,772. This operation can be effected using an adapter frame or chassis upon which the container is detachably mounted, the adapter frame being equipped with the king pin, support legs or landing gear and separable bogies, so that the containers, singly or coupled, may be removed from the adapter frames and transferred intermodally as disclosed in application Ser. No. 461,393, filed June 4, 1965, now Patent No. 3,317,219. Several means to removably couple the containers end to end as aforesaid may be employed as, for example, the couplers disclosed in Patents Nos. 2,972,175 and 3,261,070.

The American Society of Mechanical Engineers, United Engineering Center, 345 East 47th St., New York, N.Y., has published "USA Standard—Specifications for Cargo Containers—USASI MH 5.1–1965" which sets standards, among other things, for the lower corner fittings or castings for containers used in intermodal transfer. This so-called USA standard corner casting is equipped with end and side holes for accomodating retaining pins and a bottom hole of particular length, width and distance from the end wall of the casting. The bottom hole is adapted to receive a generally used twist lock carried by the adatper frame of the type shown on page 11 of the aforesaid publication entitled, "Recommened Top Corner Fitting Devices." Since a pair of 20' containers fully laden with cargo when coupled can attain a gross weight of 67,200 lbs. and the couplers are subjected to a dynamic 2 g. factor, i.e. in over-the-road travel, crane lifting, etc., each coupler must sustain a load of about 60,000 lbs. and the corner casting must sustain a shearing load resulting from tension on the coupler of twice 60,000 lbs. for a safety factor of 2. This the USA standard corner casting cannot nor is it intended to do.

The primary object of the invention is therefore to provide a bottom corner fitting or casting which is made of a material that can be readily welded in place in the container construction, which can function as the USA standard corner casting for detachable coupling to an adapter frame equipped with the generally used recommended twist locks and which can also function to accept couplers whereby the containers empty or fully laden with cargo unassociated with the adapter frames can be safely and removably coupled end to end and supported, transported and lifted as such.

Another object of the invention is to provide container corner fittings of the character described by which the containers empty or fully laden with cargo can be removably and securely coupled end to end and at the same time can be detachably coupled via the same corner fittings to an adapter chassis with a modified twist lock.

These and other objects of the invention will become more apparent as the following description proceeds in conjunction with the accompanying drawings, wherein:

FIG. 3 is a sectional view taken on the line 3—3 of FIG. 2;

FIG. 4 is a sectional view taken on the line 4—4 of FIG. 3 with a coupler head therein shown in phantom;

FIG. 5 is a sectional view taken on the line 5—5 of FIG. 3;

Figure 1:
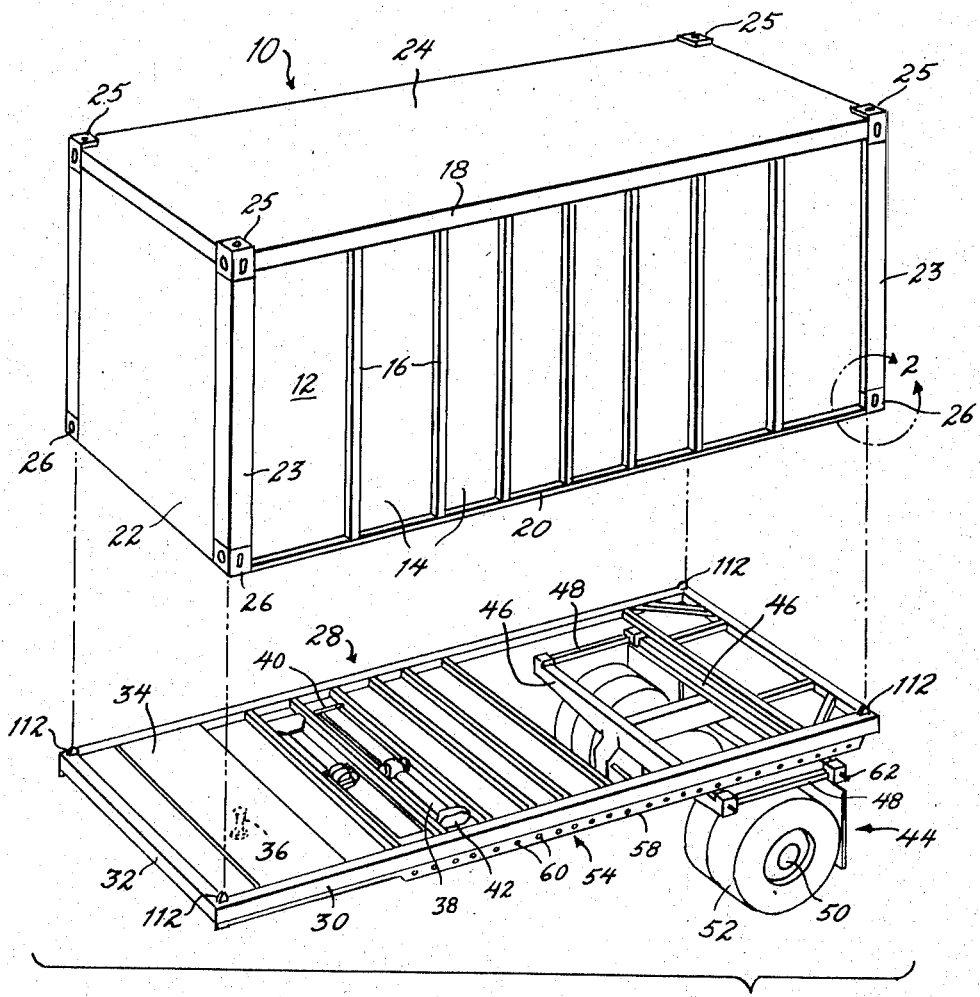
FIG. 1 is a group perspective view of a container equipped with the instant corner fittings and an adapter chassis with bogie upon which the container is to be removably mounted.
Figure 2:
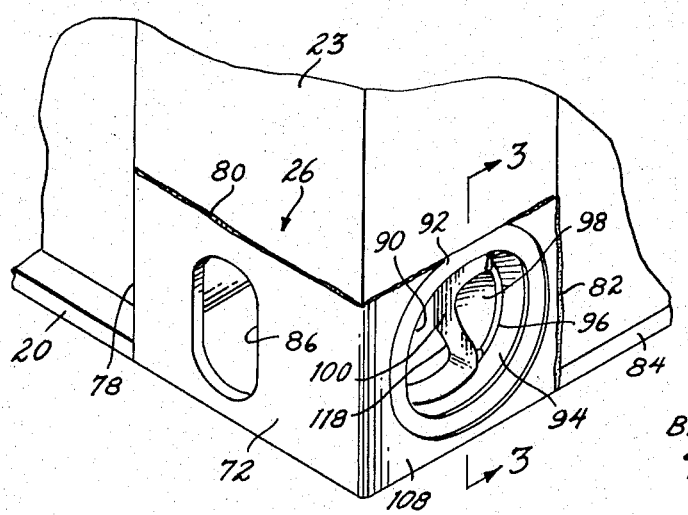
FIG. 2 is an enlarged perspective view of the left rear corner fitting as shown in the encircled area 2 in FIG. 1.
Figure 6:
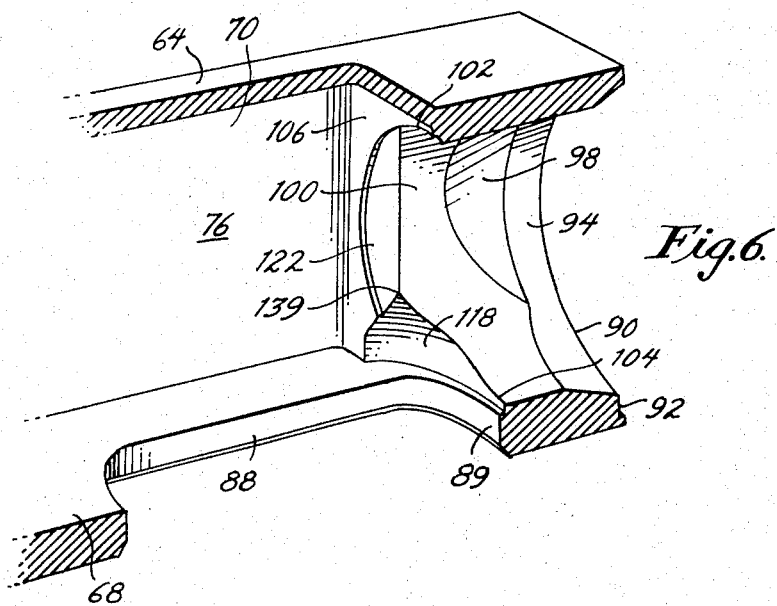
FIG. 6 is a perspective view of half of the corner member disclosing interior details.
Figure 7:
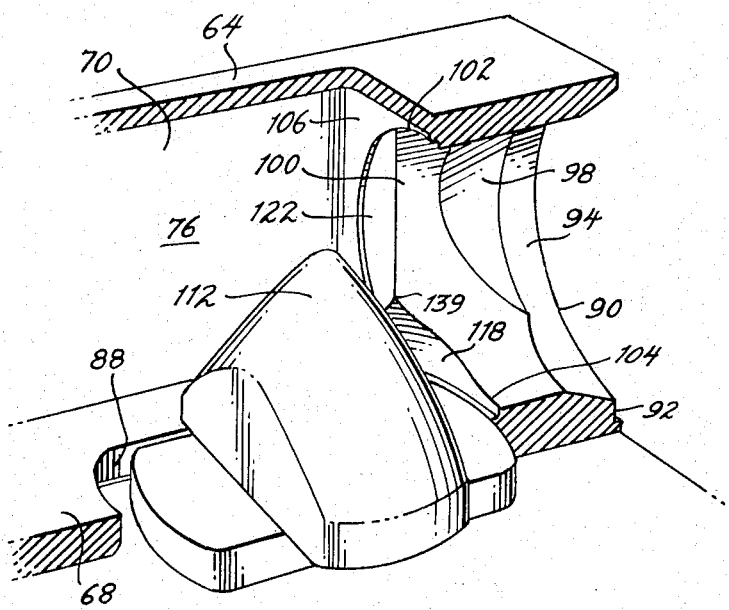
FIG. 7 is a view similar to FIG. 6 with a recommended USA twist lock therein shown in the coupled position.
Figure 8:
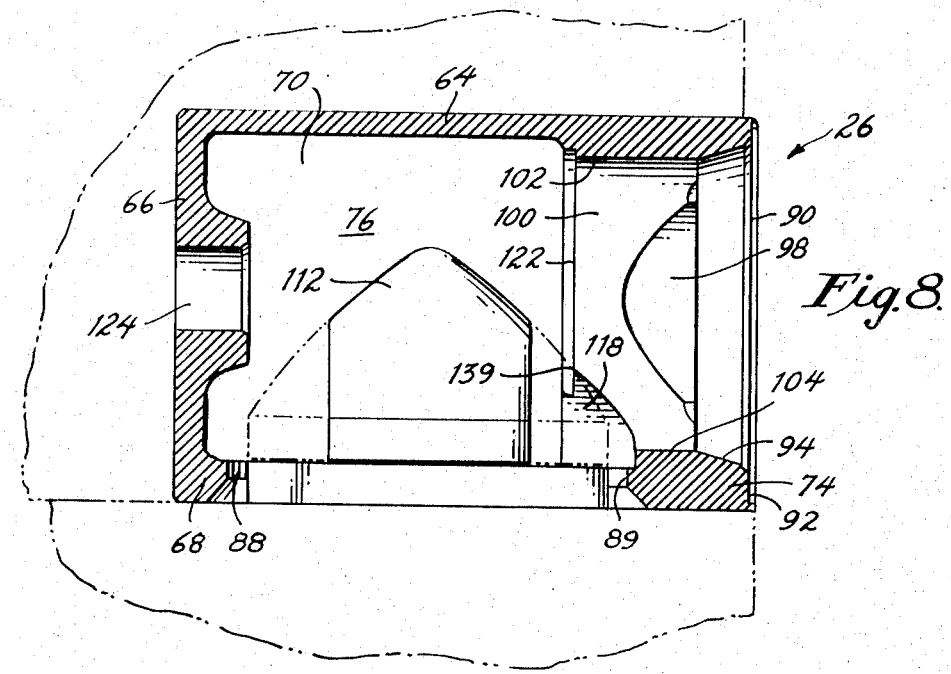
Figure 9:
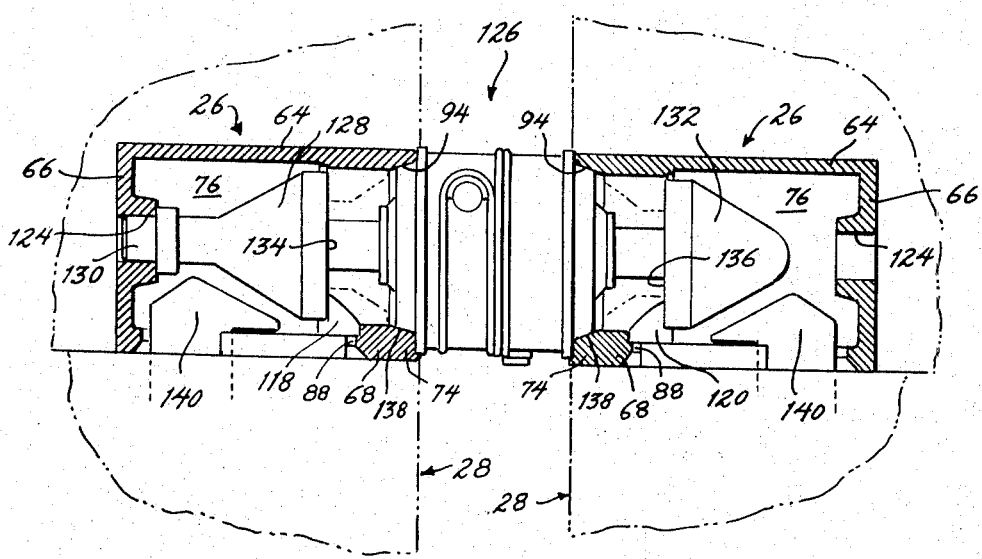

FIG. 8 is a vertical sectional view similar to FIG. 4 showing a recommended USA twist lock therein, the phantom lines showing the uncoupled position and the solid lines showing the coupled position; and FIG. 9 is a vertical sectional view through the lower corner members of the adjacent corners of a pair of containers showing the simultaneous engagement therein of the heads of horizontal coupler and of modified twist locks carried by the adapter frames.

Specific reference is now made to the drawings in which similar reference characters are used for corresponding elements throughout.

A container 10 is provided in the form preferably of a van size cargo or trailer body and of stressed skin construction whose sidewalls 12 consist of metallic sheets in the form of panels 14 which are secured to and between vertical posts 16 the function of which is to prevent buckling of the sidewalls. The panels and posts are secured by appropriate means to a top longitudinal rail 18 and a bottom longitudinal rail 20. This construction is continued for the end walls 22 except that the rear end wall (not shown fully) will contain the usual doors. To complete the container, which is preferably rectangular, vertical corner posts 23 are provided, a roof sheet 24 is secured to and between the top rails; and cross sills (not shown) are connected across the bottom rails 20 upon which a floor (not shown) is installed. In this stressed skin construction, known in the trade as frameless, a load on the floor is taken by the sidewalls 12 and the sheets or skin 14 are an essential part of the load-carrying system. Secured to the corner posts and rails are upper corner members, fittings or castings 25 and lower members, fittings or castings 26, the latter constituting the instant invention which will be later described in detail.

The adapter frame preferably runs the full length and width of the container and comprises longitudinal side beams 30 joined by cross members 32. Adjacent its front end the frame mounts a plate 34 having a depending king pin 36. Immediately to the rear of the king pin assembly are longitudinally staggered conventional supports or landing gears 38 which are hingedly connected at their upper ends as at 40 about longitudinal pins secured between adjacent cross members 32 so that the landing gears can be extended to vertical positions in which the feet 42 can engage the ground or can be folded to horizontal positions beneath the container and between the cross members so that the wheeled unit or bogie 44 can pass unobstructed from one adapter frame to the next, as will be described hereinafter.

The bogie 44 consists essentially of a frame having cross members 46 joined by longitudinal side members 48. The bogie frame flexibly mounts springs on both sides thereof (not shown) which centrally support a single transverse axle 50 which in turn mounts wheels 52 at its ends. The bogies is, of course, provided with a brake mechanism and hose connection to the emergency and service lines of the tractor, as is well known in the art.

Affixed by welding or other suitable means to the bottom of side members 30 of the adapter frame and extending for a predetermined length to the rear of the adapter frame are track angles 54, each including a horizontally extending portion and a vertically extending portion 58 at an angle of about 75° to the horizontal, the vertically extending portion including longitudinally spaced apertures 60 which are in transverse alignment with the apertures on the track angle on the other side of the adapter frame.

Each bogie is equipped with a releasable coupling mechanism of the type shown and described in Patent Nos. 3,004,772 and 2,831,700 consisting of crank-operated spring urged pins 62 which extend laterally through members adjacent the corners of the bogie frame. When the pins are released they extend as well through selected apertures 60 in the track angles 54 and thus couple the bogie to the adapter frame in adjusted positions. When the pins 62 are retracted, the bogie is free to slide beneath the adapter frame. It will be noted that widthwise the bogie frame extends beneath the cross members 32 of the adapter frame and between the vertical portions 58 of the track angle 54 and these portions 58 are outboard of the inner peripheries of the bogie wheels 52 to permit ease of shifting the adapter frame and container coupled thereto relative to the bogies and to minimize canting due to shifting the loads in the container.

The lower corner member or fitting 26 is preferably cast of mild steel which is capable of withstanding tensile yield stresses in the order of magnitude of 40,000 p.s.i. It is made of mild steel because it can be readily welded in place to the steel corner posts and side rails connectors. Since the lower corner members are identical in construction except for right hand and left hand orientation, a single description will suffice.

The fitting or casting is essentially a hollow cubiform member having a top horizontal wall 64, an inner vertical end wall 66, a horizontal bottom wall 68, an inner vertical side wall 70, an outer vertical side wall 72 and an outer vertical end wall 74 forming between them a generally cuboid cavity 76. The inner end wall 66 is welded as at 78 to a steel connector (not shown) which is in turn bolted to the end of the channel side rail 20, the top wall 64 is welded as at 80 to the lower edge of the hollow corner post 23 and the inner side wall 70 is welded as at 82 to the end of transversely extending channel bottom sills 84 which forms the lower horizontal frame member of the end structure. The inner end wall 66, top wall 64 and inner side wall 70 may be formed with ribs (not shown) extending out of the planes of the walls to fit closely into the connectors for the channel side rails 20, corner posts 23 and transverse sills 84 to properly locate them on the corner casting and to provide proper weld areas. The outer side wall 72 is provided with an elongated slot 86 adapted to receive a suitable retaining device.

The bottom wall 68 is provided with an elongated slot 88. In accordance with the aforesaid USA standard this slot is about 4⅞″ long and about 2½″ wide. The distance A from the center line of the slot to the outer face of the outer end wall 74 is about 4″, see FIG. 5. Thus the end 89 of the slot 88 facing said end wall is about 1%₆″ from the outer face of said end wall 74.

The outer end wall 74 is provided with a circular opening 90 around which is a slightly recessed spot-faced area 92. Moving inwardly toward the cavity 76 from the opening 90, the wall 74 includes an inwardly tapered conical throat 94. At the inner edge 96 of the throat, the wall 74 is provided with portions 98 which extend radially inwardly, which portions have concave semi-conical surfaces. Thus the circular opening 90 is, in effect, narrowed to form an elongated slot 100 which communicates with the cavity 76. The upper and lower edges 102 and 104 of the slot 100 are non-tapered and flush with the inner edge 96 of the throat between the inwardly protruding semi-conical concave portions 98.

Since a pair of standard 8′ x 8′ x 20′ containers (known in the trade as 20′ containers) fully laden with cargo, when coupled, can attain a gross weight of 67,200 lbs. and the couplers are subjected to a dynamic 2 g. factor during transportation and lifting, the corner member 26 must sustain a shearing load resulting from tension on the coupler of twice 60,000 lbs. for a safety factor of 2. For this, the thickness of the outer end wall 74, i.e. the distance B, see FIG. 5, from its inner surface 106 to its outer surface 108 must be about 2%₆″. Since the distance A from the end 89 of the slot 88 in the bottom horizontal wall to the outer face 108 of the vertical end wall 74 is about 1%₆″, it will be seen that the inner surface 106 of the end wall 74 will overlap the slot 88 at its edge 89 facing the end wall 74.

Thus the tapered or pyramidal head 112 of the USA recommended twist lock, which is rotatably mounted adjacent the corners of the adapter frame 28 and which closely approximates the dimensions of the bottom slot 88, could not be rotated from the about-to-couple position wherein the head 112 is aligned with the slot 88 to the coupled position in which it traverses the slot 88. To permit this rotation into the coupling position to take place, the lower corners 114 and 116 which overlap the bottom slot 88, shown in dotted lines in FIG. 5, are cut off to form indentations 118 and 120, preferably arcuated to conform to the curvature of the edge 89 of the bottom slot 88 facing the end wall 74.

The inner surface 106 of the end wall 74 includes machined surfaces 122 on the other side of the semi-conical portions 98 while the inner vertical end wall 66 is provided with a boss with a through bore forming a reduced socket 124 which is axially aligned with the circular opening 90 for a purpose soon to appear.

In use, the container 10 can be positioned on the adapter frame or chassis 28 so that the coupler heads 112 when aligned with the slots 88 in the bottom of the lower corner members 26, can enter the cavities 76 in the corner members through said slots. Then the heads 112 can be rotated to traverse the slots to effect the coupling of the container to the adapter frame, the widest portions of the head passing through the indented lower portions 118 and 120 of the end wall 74 and thus clearing said end wall.

If the carrier was desirous of coupling the fully laden or empty containers end to end, he could insert a double headed coupler through the circular openings 90 of the lower corner members 26 of adjacent containers until the heads enter the respective cavities 76 and then rotate until the heads traverse the respective slots 100 in the confronting end walls 74 of the containers. The preferred horizontal coupler is that shown in Patent No. 3,261,070 and indicated generally at 126 in FIG. 9. The coupler is first mounted in each lower corner member 26 of one container by aligning one of its heads 128 with the slot 100 and passing it through the slot until it enters the cavity 76 and the reduced end 130 thereof is seated in the socket 124. The second container is then moved towards the first until the other heads 132 of the coupler extend through the slots 100 in the end walls 74 of the lower corner members 26 of the second container and into the cavities 76 thereof. Rotation of the coupler will then cause the heads 128 and 132 to traverse the slots 100 and thereby couple the containers. In the process of rotation of the coupler the inner faces 134 and 136 engage the machined surfaces 122 of the end walls 74 of the respective containers. The inwardly tapered conical throat 94 around the slot 100 of the corner member engages the conical portions 138 of the coupler. The simi-conical concave portions 98 cooperate with the head 132 to bring the adjacent corner members into alignment. The coupling of the containers is completed by the use of spacers (not shown) which are removably inserted into the confronting upper corner members to take compressive forces.

The width of the coupler heads 128 and 132 is about 1¾" whereas, when installed, the distance C from the center line of the coupler, which is the center line of the corner member through the slot 100, to the outerface of the bottom wall 68, see FIG. 3, of the corner member is about 2½". The maximum depth of each of the cut-outs or indentations 118 and 120 is about 1 1/16" whereas its height, that is the distance D, see FIG. 4, from the outer surface of the bottom wall 68 to the joint 139 where the indentation stops is about 1⅝". Thus when the coupler heads 128 and 132 traverse the slots 100 in the corner members, the end points 139 of the indentations are substantially at the lower edges of the coupler heads and do not extend to a point where the inner surfaces 134 and 136 of said heads would overlap said indentations. Thus the height of each indentation 118 and 120, i.e. its distance from the outer surface of the bottom wall 68 to the end point 139 should not exceed the distance C (or 2½") minus ½ the width of the coupler head.

The carrier may also desire to couple the containers end to end not only for lifting and transferring the coupled containers onto a railroad car, onboard ship, etc., but also upon the adapter frames or chassis 28 to form a dual-body tandem axle vehicle convertible to single body single axle vehicles and vice versa in accordance with Patent No. 3,004,772 and the aforementioned application Ser. No. 461,393 filed June 4, 1965. In that case, as shown in FIG. 9, the containers are equipped with the corner members 26 of the instant invention and the adapter frame 28 is equipped at its corners with rotatable couplers or twist locks whose heads 140 are shallower than the aforementioned USA heads 112 and so dimensioned as to occupy the cavity 76 of the corner member at the same time that it is occupied by the head 128 (or 132) of the horizontal coupler 126 without interference of the heads with each other in the about-to-couple and coupled positions.

Thus the instant lower corner member, fitting or casting 26 is so constructed as to enable the carrier to removably mount the container on an adapter chassis using the standard USA bottom slot for engagement with the USA recommended twist lock on the adapter frame, yet also enable the carrier to couple the containers end to end, and with some modification of the twist lock to the adapter frame as well.

While a preferred embodiment has here been shown and described, it will be understood that skilled artisans may make variations without departing from the spirit of the invention and the scope of the appended claims.

I claim:

1. In a substantially rectangular freight container, members in the lower corners thereof, each of at least a pair of said corner members at one end of said container having a central cavity, a lower horizontal wall with a slot therethrough communicating with said cavity and a vertical end wall including an opening therethrough communicating with said cavity, the end of said slot facing said end wall being spaced a predetermined distance from said end wall, said end wall being of thickness exceeding said distance and having an inner surface including cut-outs in said inner surface at the bottom thereof and extending beyond said end and the sides of said slot so that a head of a vertical coupler approximating the dimensions of said slot can enter therethrough and be rotated to traverse said slot in the coupling position.

2. The combination of claim 1 wherein said corner member is adapted to receive a horizontal coupler through said opening in its vertical end wall, said end wall of said corner member being thick enough to sustain a shearing load resulting from tension on said coupler in the order of magnitude of 120,000 lbs.

3. A member for installation in the corner of a container including a central cavity, a horizontal wall with a slot therethrough communicating with said cavity and a vertical end wall including an opening therethrough communicating with said cavity, said opening including an inwardly tapered conical throat adjacent the outer surface of said vertical end wall, said vertical end wall including opposed tapered portions behind said throat extending radially inwardly of said opening, thus narrowing said opening to an elongated slot, the end of said slot in said horizontal wall facing said vertical end wall being spaced a predetermined distance from the outer surface of said vertical end wall, said vertical end wall being of thickness exceeding said distance and having an inner surface including arcuate cut-outs in said inner surface at the bottom thereof and extending beyond said end and the sides of said slot in said horizontal wall so that a head of a vertical coupler approximating the dimensions of said slot in said horizontal wall can enter therethrough and be rotated to traverse the same in the coupling position, said opening in said vertical end wall adapted to receive therethrough a horizontal coupler having a tapered head approximating said elongated slot in said vertical end wall opening and a conical portion adapted to engage said throat, said opposed radially extending tapered portions adapted to guide entry of the coupler head into said cavity of said corner member.

4. The combination of claim 3, wherein the upper and lower edges of said elongated slot in said vertical end wall opening between said radially extending tapered portions are flush with the inner edge of said throat.

5. The combination of claim 3, wherein said radially extending tapered portions are concave members having semi-conical guide surfaces.

6. A member for installation in the corner of a container including a central cavity, a horizontal wall with a slot therethrough and a vertical end wall with an opening therethrough communicating with said cavity, the end of said slot facing said end wall being spaced a predetermined distance from said end wall, said end wall being of a thickness exceeding said distance and having an inner surface including cut-outs in said inner surface at the bottom thereof and extending beyond said end and the sides of said slot so that a head of a vertical coupler approximating the dimensions of said slot can enter therethrough and be rotated to traverse said slot in the coupling position.

References Cited

UNITED STATES PATENTS

| | | | |
|---|---|---|---|
| 3,027,025 | 3/1962 | Tantlinger | 296—35 |
| 3,111,341 | 11/1963 | Fujioka | 296—35 |
| 3,162,320 | 12/1964 | Hitch | 220—23.4 |
| 3,261,070 | 10/1966 | Abolins | 220—23.4 X |
| 3,294,420 | 12/1966 | Martin | 220—1.5 X |

THERON E. CONDON, *Primary Examiner.*

GEORGE E. LOWRANCE, *Examiner.*